US008539974B2

(12) United States Patent
Peck

(10) Patent No.: US 8,539,974 B2
(45) Date of Patent: Sep. 24, 2013

(54) FORCED-FLUID SWITCH

(75) Inventor: Kevin B. Peck, Sonora, CA (US)

(73) Assignee: Sandvik Thermal Process, Inc., Sonora, CA (US)

( * ) Notice: Subject to any disclaimer, the term of this patent is extended or adjusted under 35 U.S.C. 154(b) by 253 days.

(21) Appl. No.: 13/084,968

(22) Filed: Apr. 12, 2011

(65) Prior Publication Data

US 2012/0000632 A1 Jan. 5, 2012

Related U.S. Application Data

(60) Provisional application No. 61/323,594, filed on Apr. 13, 2010.

(51) Int. Cl.
*F16K 49/00* (2006.01)
*F28F 27/02* (2006.01)

(52) U.S. Cl.
USPC .............. 137/309; 165/97; 165/100; 165/901

(58) Field of Classification Search
USPC .................. 137/625.43, 599.14, 599.11, 309, 137/637.1, 637.05; 165/97, 7, 276, 100, 165/901
See application file for complete search history.

(56) References Cited

U.S. PATENT DOCUMENTS

| | | | | |
|---|---|---|---|---|
| 1,543,740 | A * | 6/1925 | Wahle | 415/98 |
| 1,634,903 | A * | 7/1927 | Hodgkinson | 165/97 |
| 1,650,872 | A * | 11/1927 | Hulsmeyer | 165/97 |
| 3,807,425 | A * | 4/1974 | Boirum et al. | 137/110 |
| 3,964,675 | A * | 6/1976 | Euchner, Jr. | 236/15 C |
| 4,925,388 | A | 5/1990 | Iseki et al. | |
| 7,293,986 | B2 | 11/2007 | Peck et al. | |

* cited by examiner

*Primary Examiner* — John Rivell
*Assistant Examiner* — Kevin E Lynn
(74) *Attorney, Agent, or Firm* — Morgan, Lewis & Bockius LLP

(57) ABSTRACT

A forced fluid switch including a first plenum in communication with a first port; a second plenum in communication with a second port; a third plenum in switched communication with the first plenum and the second plenum and in communication with a third port; a fourth plenum in switched communication with the first plenum and the second plenum and in communication with a fourth port; and wherein the forced fluid switch has at least a first forced fluid path and a second forced fluid path, wherein in the first forced fluid path, the third plenum is in communication with the first plenum and the fourth plenum is in communication with the second plenum, and wherein in the second forced fluid path, the third plenum is in communication with the second plenum and the fourth plenum is in communication with the first plenum. A method is provided for switching forced fluid.

19 Claims, 10 Drawing Sheets

FORCED-FLUID SWITCH

RELATED APPLICATION DATA

This application claims priority under 35 U.S.C. §119(e) to U.S. Provisional Application No. 61/323,594, filed Apr. 13, 2010, entitled "Forced-Fluid Switch", the entire contents of which are incorporated herein by reference.

FIELD

The present disclosure relates to a forced-fluid switch to control forced fluid for a forced-fluid process chamber. The present disclosure also relates to a method of controlling the forced-fluid for a forced-fluid process chamber.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Many products are produced using heat treatments in furnaces. Products undergo heat treatment for many reasons. For example, in semiconductor wafer fabrication the semiconductor wafers undergo thermal curing, and in steel manufacturing the steel undergoes an annealing process for hardening the steel. Sometimes the products reside within a furnace and fluid is forced through passageways in contact with the furnace to adjust the temperature of the furnace. In some cases, the fluid is forced through the furnace and the fluid comes in contact with the product. In still other cases, the fluid may be forced through an area between the furnace and a process chamber containing the product. A furnace may be called a forced-fluid process chamber particularly in semiconductor wafer production.

Often, in semiconductor production the temperature must be controlled very precisely and minor variations in the temperature can affect the yield or the percentage of wafers that may be sold. The temperature may need to be consistent throughout the forced-fluid process chamber, and the temperature may need to be raised or lowered in a specific amount of time. Often, the temperature of the product needs to be stabilized quickly so that the next step of the manufacturing process may begin and so that the heat treatment can be controlled precisely.

SUMMARY

A forced fluid switch is disclosed. The forced fluid switch includes a first plenum in communication with a first port; a second plenum in communication with a second port; a third plenum in switched communication with the first plenum and the second plenum and in communication with a third port; a fourth plenum in switched communication with the first plenum and the second plenum and in communication with a fourth port; and the forced fluid switch has at least a first forced fluid path and a second forced fluid path, and in the first forced fluid path, the third plenum is in communication with the first plenum and the fourth plenum is in communication with the second plenum, and in the second forced fluid path, the third plenum is in communication with the second plenum and the fourth plenum is in communication with the first plenum.

A method of switching forced fluid from a first forced fluid path to a second forced fluid path is disclosed. The may include simultaneously switching a first switch including a first spherical stopper and a second switch including a second spherical stopper by moving the first spherical stopper from blocking a first passage from a first plenum to a fourth plenum to blocking a second passage from the first plenum to a third plenum, and by moving the second spherical stopper from blocking a third passage from a second plenum to the third plenum to blocking a fourth passage from the second plenum to the fourth plenum.

A method of exchanging heat with a forced-fluid process chamber is disclosed. The method may include forcing a fluid flow having a direction through a fluid path around the forced-fluid process chamber using a blower having a force; reversing the direction of the fluid flow by simultaneously switching a first switch including a first spherical stopper and a second switch including a second spherical stopper by moving the first spherical stopper from blocking a first passage from a first plenum to a fourth plenum to blocking a second passage from the first plenum to a third plenum, and by moving the second spherical stopper from blocking a third passage from a second plenum to the third plenum to blocking a fourth passage from the second plenum to the fourth plenum; maintaining the force of the blower during the reversing; and wherein the first plenum may be in communication with the blower and the second plenum may be in communication with a vacuum configured to suck the forced fluid, and the third plenum and the fourth plenum are in communication with the fluid path around forced-fluid process chamber, and in the direction of the fluid flow the forced fluid travels from the first plenum to the third plenum and from the third plenum through the forced-fluid process chamber to the fourth plenum and from the fourth plenum to the second plenum, and in the reversed direction of the fluid flow path the forced fluid travels from the first plenum to the fourth plenum and from the fourth plenum through the forced-fluid process chamber to the third plenum and from the third plenum to the second plenum.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

Therefore there is a need in the art for a forced fluid switch and method of controlling the forced fluid switch. The forced fluid switch including a first plenum in communication with a first port; a second plenum in communication with a second port; a third plenum in switched communication with the first plenum and the second plenum and in communication with a third port; a fourth plenum in switched communication with the first plenum and the second plenum and in communication with a fourth port; and wherein the forced fluid switch has at least a first forced fluid path and a second forced fluid path, wherein in the first forced fluid path, the third plenum is in communication with the first plenum and the fourth plenum is in communication with the second plenum, and wherein in the second forced fluid path, the third plenum is in communication with the second plenum and the fourth plenum is in communication with the first plenum.

Figure 1A:
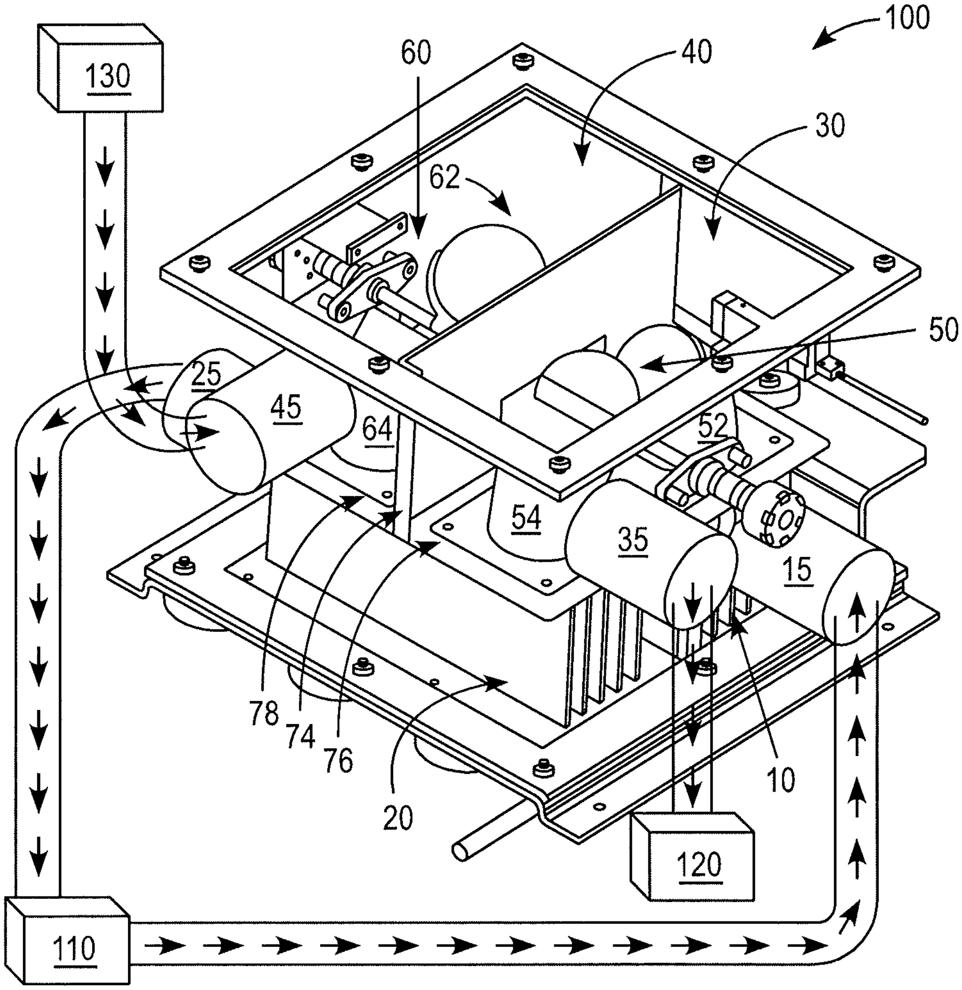
FIG. 1A is an example of a forced-fluid switch in a first state with a first forced-fluid path.
Figure 1B:
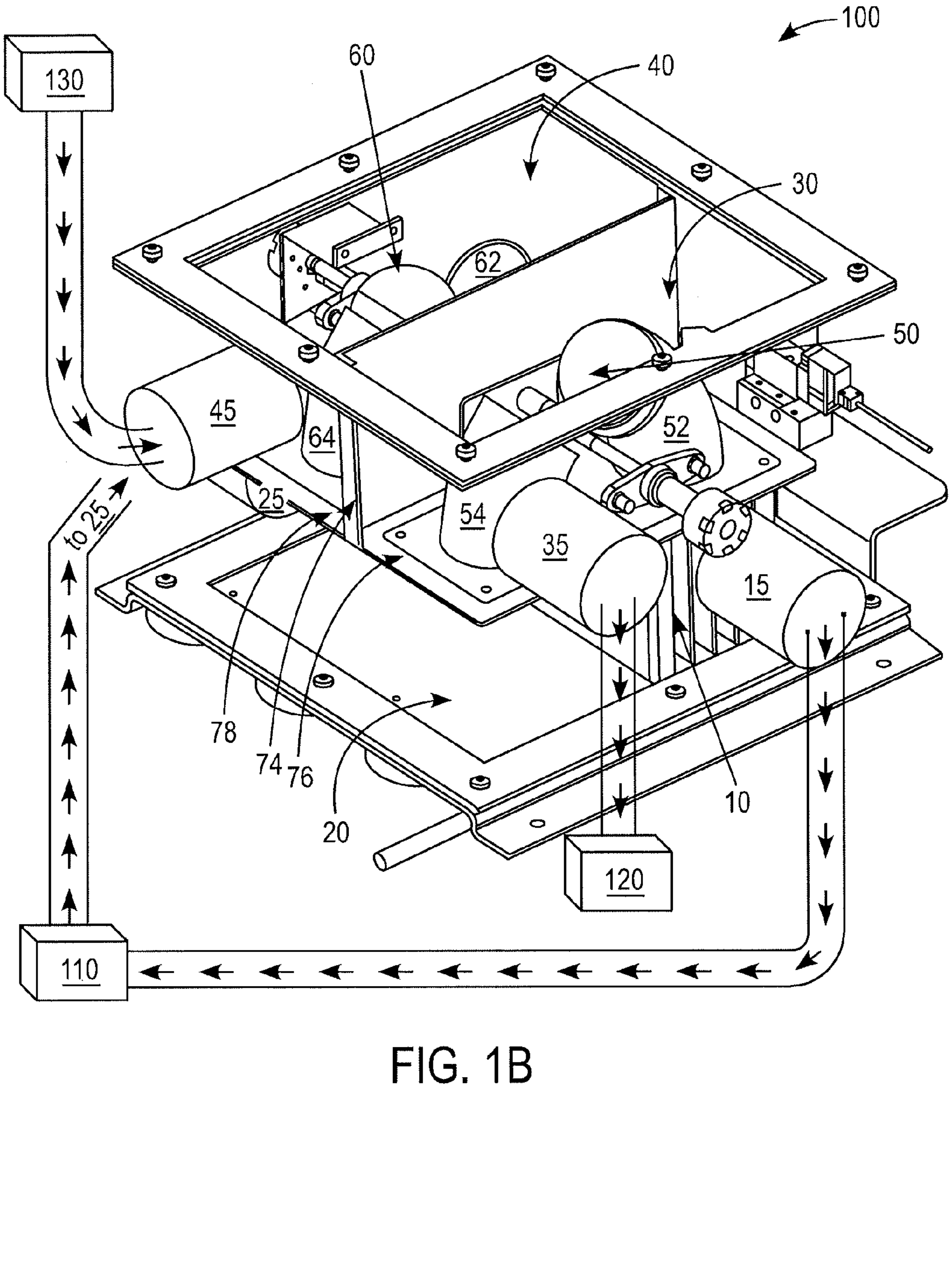
FIG. 1B is an example of a forced-fluid switch in a second state with a second forced-fluid path.

FIGS. 1A and 1B illustrate an example of a forced-fluid switch 100. The forced-fluid switch 100 includes a first plenum 10 with a first port 15, a second plenum 20 with a second port 25, a third plenum 30 with a third port 35, a fourth plenum 40 with a fourth port 45, a first valve assembly 50, and a second valve assembly 60. The fluid may be a gas such as air. In FIG. 1A cooling fins are illustrated in first plenum 10 and second plenum 20. In FIG. 1B cooling fins are illustrated in only the first plenum 10.

The first plenum 10 is formed by an enclosing case 70 (see FIG. 2), a first divider 72, a third divider 76, and a fourth divider 78. The first plenum 10 includes a first port 15. The first port 15 is in communication with a forced-fluid process chamber 110. The first plenum 10 is in switching communication with the third plenum 30 and the fourth plenum 40. The first plenum 10 is in communication with the third plenum 30 as illustrated in FIG. 1A when the first valve assembly 50 and the second valve assembly 60 are in a first state. The first plenum 10 is in communication with the fourth plenum 40 as illustrated in FIG. 1B when the first valve 50 and the second valve assembly 60 are in a second state. The first plenum 10 may be in communication with both the third plenum 30 and the fourth plenum 40 during a transition period when the first valve assembly 50 and the second valve assembly 60 are switching between a first state as illustrated in FIG. 1A and a second state as illustrated in FIG. 1B.

The second plenum 20 is formed by an enclosing case 70 (see FIG. 2), a first divider 72, a third divider 76, and a fourth divider 78. The second plenum 20 includes a second port 25. The second port 25 is in communication with a forced-fluid process chamber 110. The second plenum 20 is in switching communication with the third plenum 30 and the fourth plenum 40. The second plenum 20 is in communication with the fourth plenum 40 as illustrated in FIG. 1A when the first valve assembly 50 and the second valve assembly 60 are in a first state. The second plenum 20 is in communication with the third plenum 30 as illustrated in FIG. 1B when the first valve 50 and the second valve assembly 60 are in a second state. The second plenum 20 may be in communication with both the fourth plenum 40 and the third plenum 30 during a transition period when the first valve assembly 50 and the second valve assembly 60 are switching between a first state as illustrated in FIG. 1A and a second state as illustrated in FIG. 1B.

The third plenum 30 is formed by an enclosing case 70 (see FIG. 2), a second divider 74, and a third divider 76. The third plenum 30 includes a third port 35. The third port 35 is in communication with an active exhaust extractor 120. The third plenum 30 is in switching communication with the first plenum 10 and the second plenum 20. The third plenum 30 is in communication with the first plenum 10 as illustrated in FIG. 1A when the first valve assembly 50 and the second valve assembly 60 are in a first state. The third plenum 30 is in communication with the second plenum 20 as illustrated in FIG. 1B when the first valve 50 and the second valve assembly 60 are in a second state. The third plenum 30 may be in communication with both the first plenum 10 and the second plenum 20 during a transition period when the first valve assembly 50 and the second valve assembly 60 are switching between a first state as illustrated in FIG. 1A and a second state as illustrated in FIG. 1B.

The fourth plenum 40 is formed by an enclosing case 70 (see FIG. 2), a second divider 74, and a fourth divider 78. The fourth plenum 40 includes a fourth port 45. The fourth port 45 is in communication with a blower unit 130. The fourth plenum 40 is in switching communication with the first plenum 10 and the second plenum 20. The fourth plenum 40 is in communication with the second plenum 20 as illustrated in FIG. 1A when the first valve assembly 50 and the second valve assembly 60 are in a first state. The fourth plenum 40 is in communication with the first plenum 10 as illustrated in FIG. 1B when the first valve 50 and the second valve assembly 60 are in a second state. The fourth plenum 40 may be in communication with both the first plenum 10 and the second plenum 20 during a transition period when the first valve assembly 50 and the second valve assembly 60 are switching between a first state as illustrated in FIG. 1A and a second state as illustrated in FIG. 1B.

The enclosing case 70 (see FIG. 2) as illustrated in FIGS. 1A and 1B includes four sides 71, a bottom 73, and a top 75, and is in a box shape. In embodiments, the enclosing case 70 may be composed of several different parts or a single part. The enclosing case 70 could be a spherical shape or many different suitable three dimensional shapes. Additionally, the first divider 72, the second divider 74, the third divider 76, and the fourth divider 78 (see FIGS. 1A and 1B) are substantially flat and straight. The first divider 72, the second divider 74, the third divider 76, and/or the fourth divider 78 could be many different shapes and still perform the same function. In addition, the first divider 72, the second divider 74, the third divider 76, and the fourth divider 78 could be incorporated into the other parts of the forced-fluid switch 100 such as the enclosing case 70, and/or combined together into fewer dividers.

FIG. 1A and FIG. 1B illustrate that the forced-fluid switch may be used to reverse the direction of forced fluid though a forced-fluid process chamber 110.

As illustrated in FIG. 1A, in operation, when the forced-fluid switch 100 is in a first state for a first forced-fluid path, fluid flows from the blower 130 through the fourth port 45 into the fourth plenum 40, through the second valve assembly 60 into the second plenum 20, out the second port 25 through the forced-fluid process chamber 110, through the first port 15 into the first plenum 10, through the first valve assembly 50 into the third plenum 30, and through the third port 35 into a vacuum and an active exhaust extractor 120.

As illustrated in FIG. 1B, in operation, when the forced-fluid switch 100 is in a second state for a second forced-fluid path, fluid flows from the blower 130 through the fourth port 45 into the fourth plenum 40, through the second valve assembly 60 into the first plenum 10, out the first port 15 through the forced-fluid process chamber 110, through the second port 25 into the second plenum 20, through the first valve assembly 50 into the third plenum 40, and through the third port 35 into a vacuum and an active exhaust extractor 120.

The first port 15, the second port 25, the third port 35, and the fourth port 45 may be in communication with different apparatuses than illustrated in the example of FIG. 1. For example, the third port 35 may be in communication with an input of the blower 130. Additionally, since the forced-fluid switch may be sealed, the forced-fluid switch may be incorporated into systems requiring a recirculation (closed loop) or semi-recirculating cooling flow. For example, the forced-fluid switch 100 may be used when an inert gas must be used and recycled as the cooling fluid for a forced-fluid process chamber 110.

The active exhaust extractor 120 may be powered by a venturi device. The active exhaust extractor 120 may be a passive exhaust. The blower may be powered by a centrifugal blower.

Figure 2:
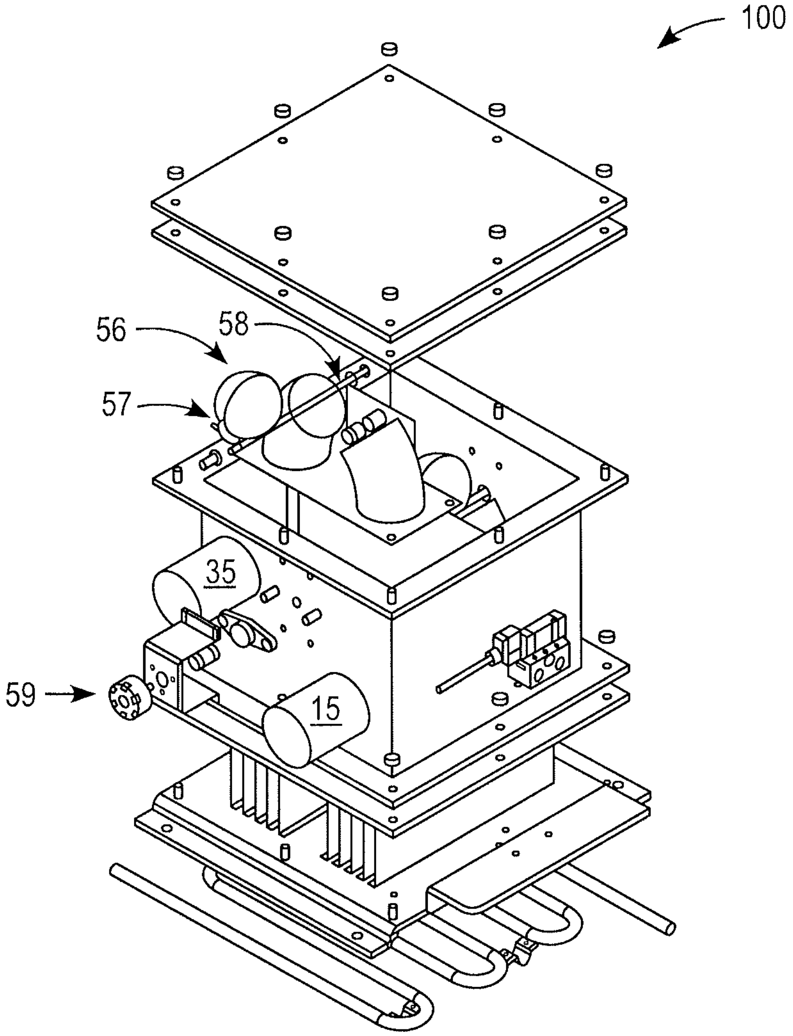
FIG. 2 illustrates an example of a forced-fluid switch, the first valve assembly and the enclosing case.

FIG. 2 illustrates an example of a forced-fluid switch, the first valve assembly and the enclosing case 70. As illustrated in FIG. 2, the first valve assembly 50 includes a first conduit 52, a second conduit 54, a first spherical stopper 56, a first connector 57, a first shaft 58, and a first rotary actuator 59. For discussion purposes, the first valve assembly 50 is illustrated out of the forced-fluid switch 100. The first conduit 52 connects the third plenum 30 with the first plenum 10. The second conduit 54 connects the third plenum 30 with the second plenum 20. The first spherical stopper 56 may be articulated between the first conduit 52 and the second conduit 54 by the first shaft 58. A first connector 57 attaches the first spherical stopper 56 to the first shaft 58. The spherical stopper 56 is rotationally attached to the first connector 57. The first connector 57 is attached to the first shaft 58. The first shaft 58 is connected to a first rotary actuator 59 that moves the first spherical stopper 56 from blocking the first conduit 52 to blocking the second conduit 54. The attachment of the first spherical stopper 56 to the first shaft 58 permits the first spherical stopper 56 to have some adjustment room to fit snugly into the first conduit 52 and the second conduit 54. The enclosing case 70 includes four sides 71, a bottom 73, and a top 75.

Figure 3:
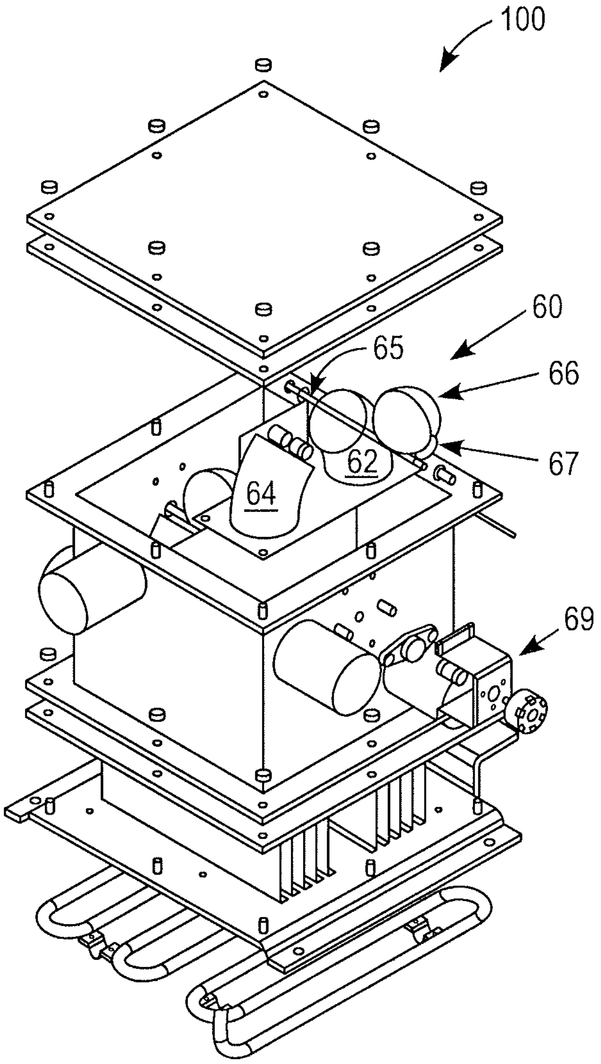
FIG. 3 illustrates an example of a forced-fluid switch and the second valve assembly.

FIG. 3 illustrates an example of a forced-fluid switch 100 and the second valve assembly. As illustrated in FIG. 3, the second valve assembly 60 includes a third conduit 62, a fourth conduit 64, a second spherical stopper 66, a second connector 67, a second shaft 68, and a second rotary actuator 69. For discussion purposes, the second valve assembly 60 is illustrated out of the forced-fluid switch 100. The third conduit 62 connects the fourth plenum 40 with the first plenum 10. The fourth conduit 64 connects the fourth plenum 40 with the second plenum 20. The second spherical stopper 66 may be articulated between the third conduit 62 and the second conduit 64 by the second shaft 68. A second connector 67 attaches the second spherical stopper 66 to the second shaft 68. The second spherical stopper 66 is rotationally attached to the second connector 67. The second connector 67 is attached to the second shaft 68. The second shaft 68 is connected to a second rotary actuator 69 that moves the second spherical stopper 66 from blocking the third conduit 62 to blocking the fourth conduit 64. The attachment of the second spherical stopper 66 to the second shaft 68 permits the second spherical stopper 66 to have some adjustment room to fit snugly into the third conduit 62 and the fourth conduit 64.

In operation, in the embodiment discussed above, the first valve assembly 50 and the second valve assembly 60 are self-aligning due to the nature of the spherical stoppers coming in contact with the conduits. The forced fluid forces the spherical stopper into an aligned position to stop the flow of fluid as long as the shaft and actuator permit the spherical stopper to move into the conduit in reaction to the force of the fluid so as to seal the conduit. Additionally, in the embodiment discussed above, resistance to fluid is lessened by the spherical shape of the spherical stoppers during actuation due to the shape of the sphere. When a spherical stopper is stopping the flow of fluid into a conduit, a small motion of the actuator will allow some fluid to flow into the conduit and because of the spherical shape of the stopper the fluid will not create a large force opposing the motion of the spherical stopper to continue to open. This design enables the fluid flow to be reversed through an apparatus even in high fluid flow conditions without powering down the blower or the active exhaust extractor. This may be very important in some applications where maintaining a constant temperature is important. Additionally, this may improve cooling performance and shorten stabilization times which increases throughput and may shorten manufacturing time. Additionally, a spherical stopper has the advantage that when it expands and contracts due to the temperature changes it remains in a shape that will still fit within the conduits and seal the conduits.

In embodiments, the first valve assembly 50 and the second valve assembly 60 may be actuated by a single actuator. For example, the first valve assembly 50 and the second valve assembly 60 may be arranged 180 degrees apart. In embodiments, the rotary actuator may be a linear actuator with the motion converted by mechanical means to a rotary force. In embodiments, the valve openings are arranged to be substantially co-linear, and a linear actuator articulates a stopper between the two co-linear valve openings.

The first conduit 52, the second conduit 54, the third conduit 62, and the fourth conduit 64 may be constructed from tubular valve seats. In embodiments, the first conduit 52, the second conduit 54, the third conduit 62, and the fourth conduit 64 are approximately 50 millimeters (MM) to minimize the back pressure generated by fluid flows of approximately 100 standard cubic feet per minute (SCFM).

Figure 4:
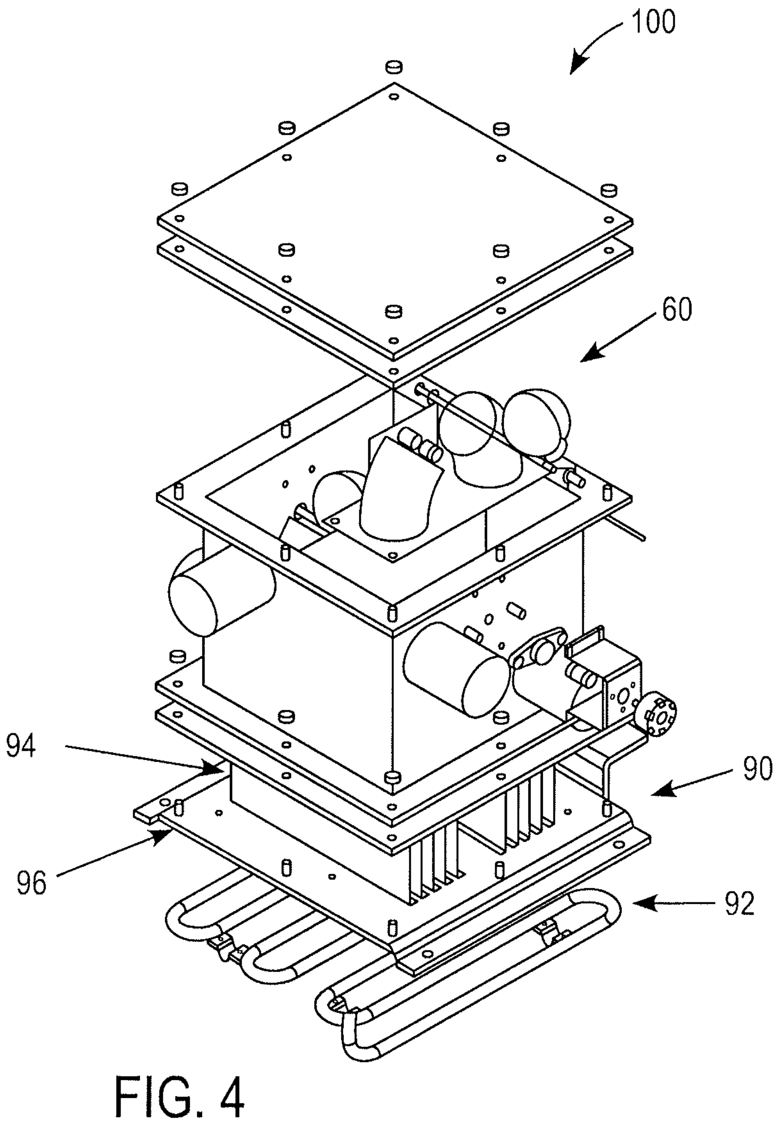
FIG. 4 illustrates an example of a forced fluid switch with a cooling system.

FIG. 4 illustrates an example of a forced fluid switch with a cooling system. The cooling system 90 includes a water pipe 92 and fins 94. The fluid pipe 92 may be constructed of a metal such as copper or a hard plastic. The fluid pipe 92 holds a fluid that is circulated by a means such as a pump (not illustrated.) The fluid may be cooled by a means such as a compressor (not illustrated) or chiller (not illustrated) to transfer heat from the fins 94 and the forced-fluid switch 100 to the pipe 92 and the fluid that is circulated by the pipe 92. The pipe 92 may be attached to a side 96 of the forced-fluid switch 100. The fins 94 may be constructed of a metal such as aluminum or stainless steel. The fins 94 may be attached to a side 96 of the forced-fluid switch 100 opposite to the pipe 92. The fins 94 may transfer heat from the forced-fluid in the forced-fluid switch 100 to the fins 94 and to the side 96. The fins 94 may be positioned in the first plenum 10 and the second plenum 20. The fins 94 may be positioned in different plenum(s) of the forced-fluid switch 100. The fins 94 may provide the advantage of cooling the forced-fluid in the forced-fluid switch 100 when the forced fluid is returning from a heat source such as a forced-fluid process chamber 110 (Illustrated in FIG. 1). By cooling the forced fluid when the fluid enters the forced-fluid switch 100 with the fins 94 the forced fluid may cool the forced fluid so that the forced fluid does not damage parts of the forced-fluid switch 100. By cooling the forced fluid when it returns from a heat source, it may be possible to construct the forced-fluid switch 100 of less expensive materials. Additionally, the fins 94 may cool the forced-fluid before the forced fluid flows to a source of heat such as the forced-fluid process chamber 110 (illustrated in FIG. 1). The forced-fluid switch 100 can then act as a cooler for the heat source such as the forced-fluid process chamber 110 (illustrated in FIG. 1). The cooling system 90 may provide the advantage that by including the cooling system 90 within the forced-fluid switch 100 the forced-fluid switch 100 can switch the direction of the flow of fluid and provide a source of cooling.

Figure 5:
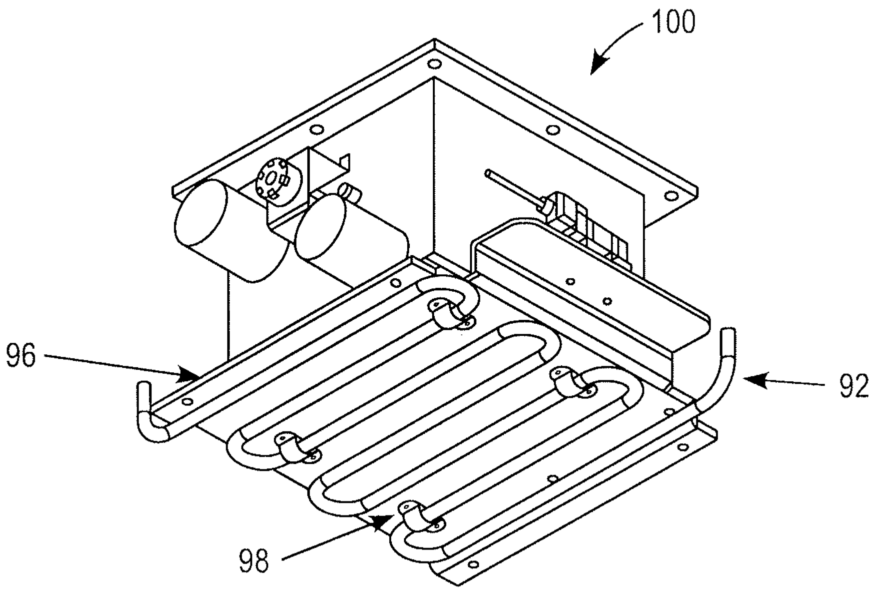
FIG. 5 illustrates an example of a forced fluid switch from a bottom view.

FIG. 5 illustrates an example of a forced-fluid switch from a bottom view. The pipe 92 is attached to a side 96 of the forced-fluid switch 100 with a clamp 98. The fins (not illustrated) are attached to the side 96 so that the fins project into the first plenum 10 and the second plenum 20 of the forced-fluid switch 100. Heat flows from the forced fluid to the fins to the side 96 then to the pipe 92 then to the fluid in the pipe 92 to an another source such as a compressor.

Figure 6:
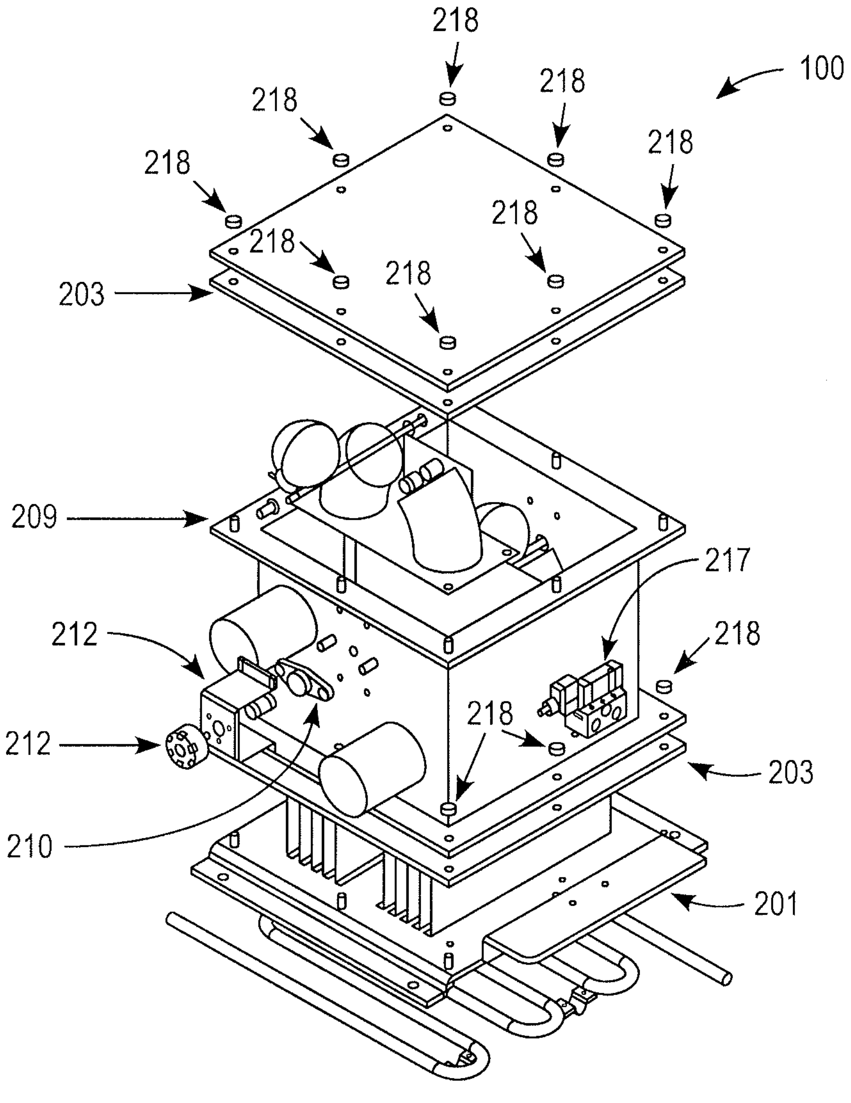
FIG. 6 illustrates a detailed example of a forced fluid switch.

FIG. 6 illustrates a detailed example of a forced-fluid switch. The forced-fluid switch 100 includes a base plate 201, gaskets 203, a sleeve 209, a bearing-assembly 210, a first rotary actuator mount 212, a second rotary actuator mount (not illustrated), a first actuator 213, a second actuator (not illustrated), a cover 216, a solenoid valve 217, and hex nuts 218. The first actuator 213 controls the position of the first valve (not illustrated). And the second actuator (not illustrated) controls the position of the second valve (not illustrated). The solenoid valve 217 may control the first actuator 213 and the second actuator (not illustrated). The solenoid valve 217 may be in communication with a controller (not illustrated) that controls the operation of the forced-fluid switch 100.

Figure 7:
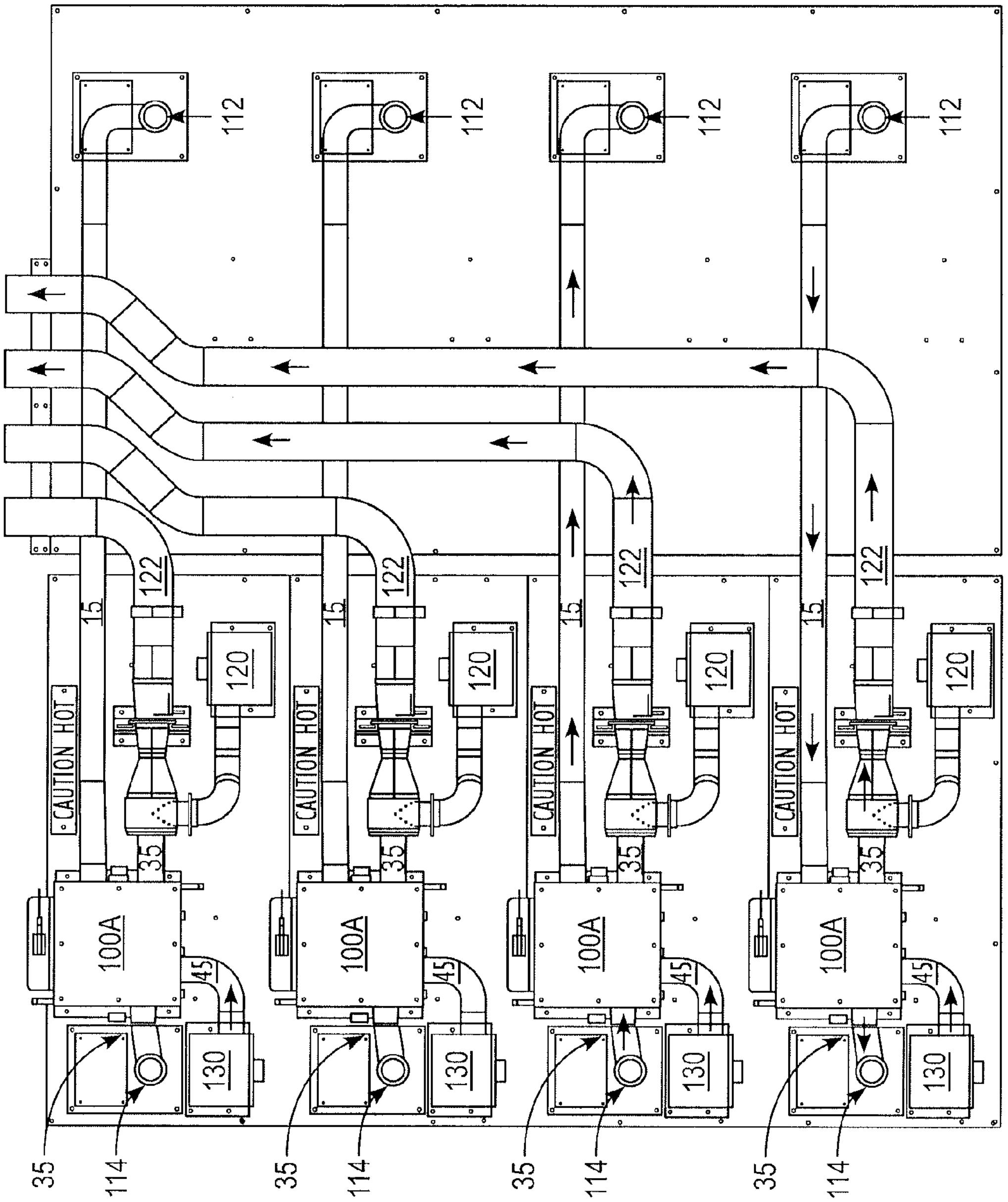
FIG. 7 illustrates an example of four forced-fluid switches retrofitted into existing systems.

FIG. 7 illustrates an example of four forced-fluid switches retrofitted into existing systems. The retrofitted existing systems include four forced-fluid switches 100A, 100B, 100C, and 100D, a blower 130, an active exhaust extractor 120, a first fluid way 112 to a forced-fluid process chamber, a second fluid way 114 into a forced-fluid process chamber, a first port 15, a second port 25, a third port 35, and a fourth port 45. The first fluid way 112 and the second fluid way 114 are in communication with one another via a forced-fluid process chamber. Forced-fluid switch 100A as illustrated is configured as in FIG. 1A in a first state for a first forced-fluid path. Forced-fluid switch 100B as illustrated is configured as in FIG. 1B in a second state for a second forced-fluid path. The first port 15 is in communication with the first fluid way 112. The second port 25 is in communication with the second fluid way 114. The third port 35 is in communication with the active exhaust extractor 120. The fourth port 45 is in communication with the blower 130. Each of the first port 15, the second port 25, the third port 35, and the fourth port 45 may be in communication via a fluid pathway that may be a duct constructed of metal or hard plastic or another suitable material. Each of the first port 15, the second port 25, the third port 35, and the fourth port 45 may be arranged differently so as to be compatible with existing systems or so as to be compatible with the design of a new system. The active exhaust extractor 120 may be a blower that that powers a venturi device.

The materials used for the forced-fluid switch may be designed to be compatible with fluids such as fluids with elevated temperatures.

Figure 8A:
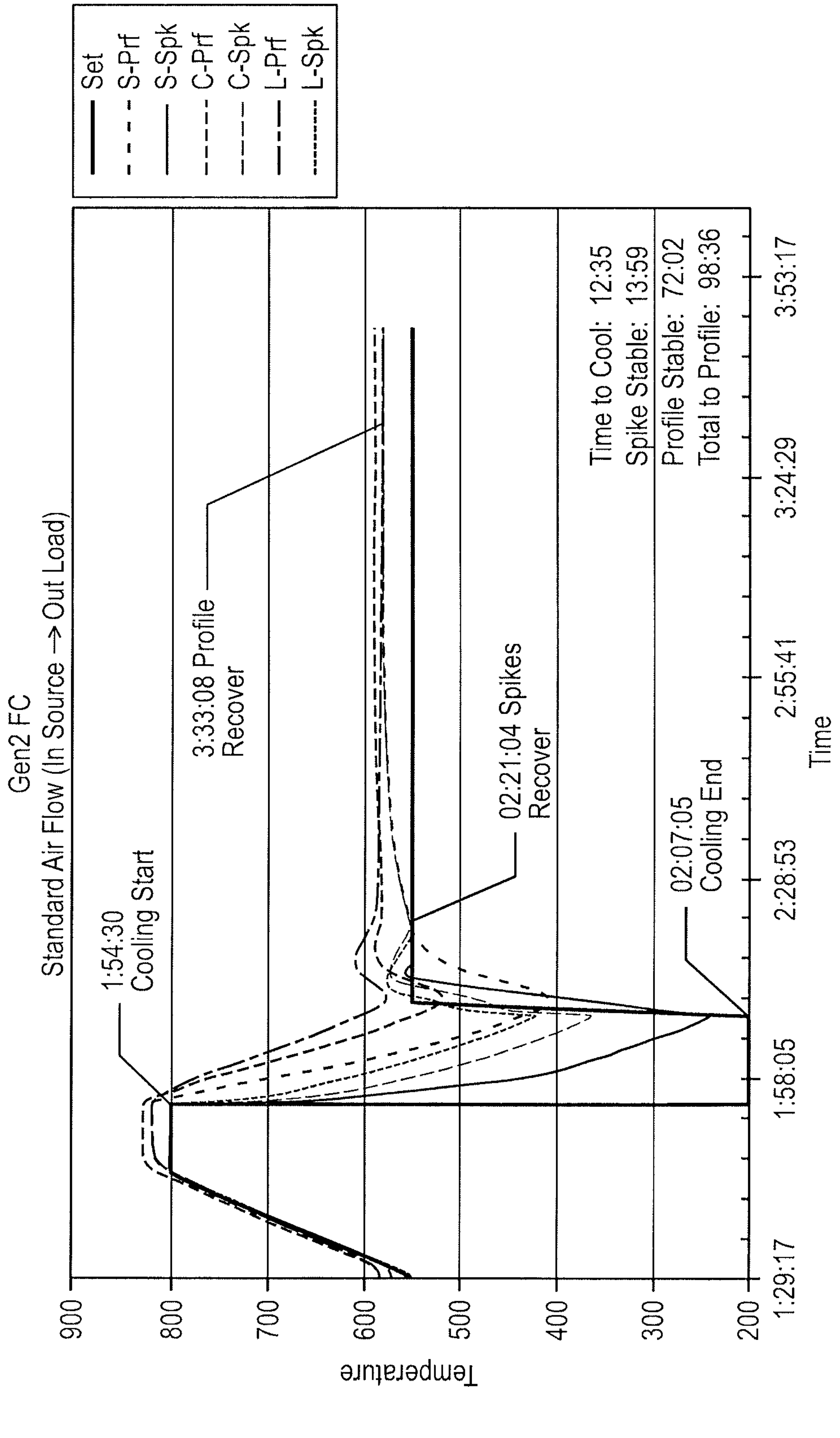
FIG. 8A illustrates an example of cooling in one direction.
Figure 8B:
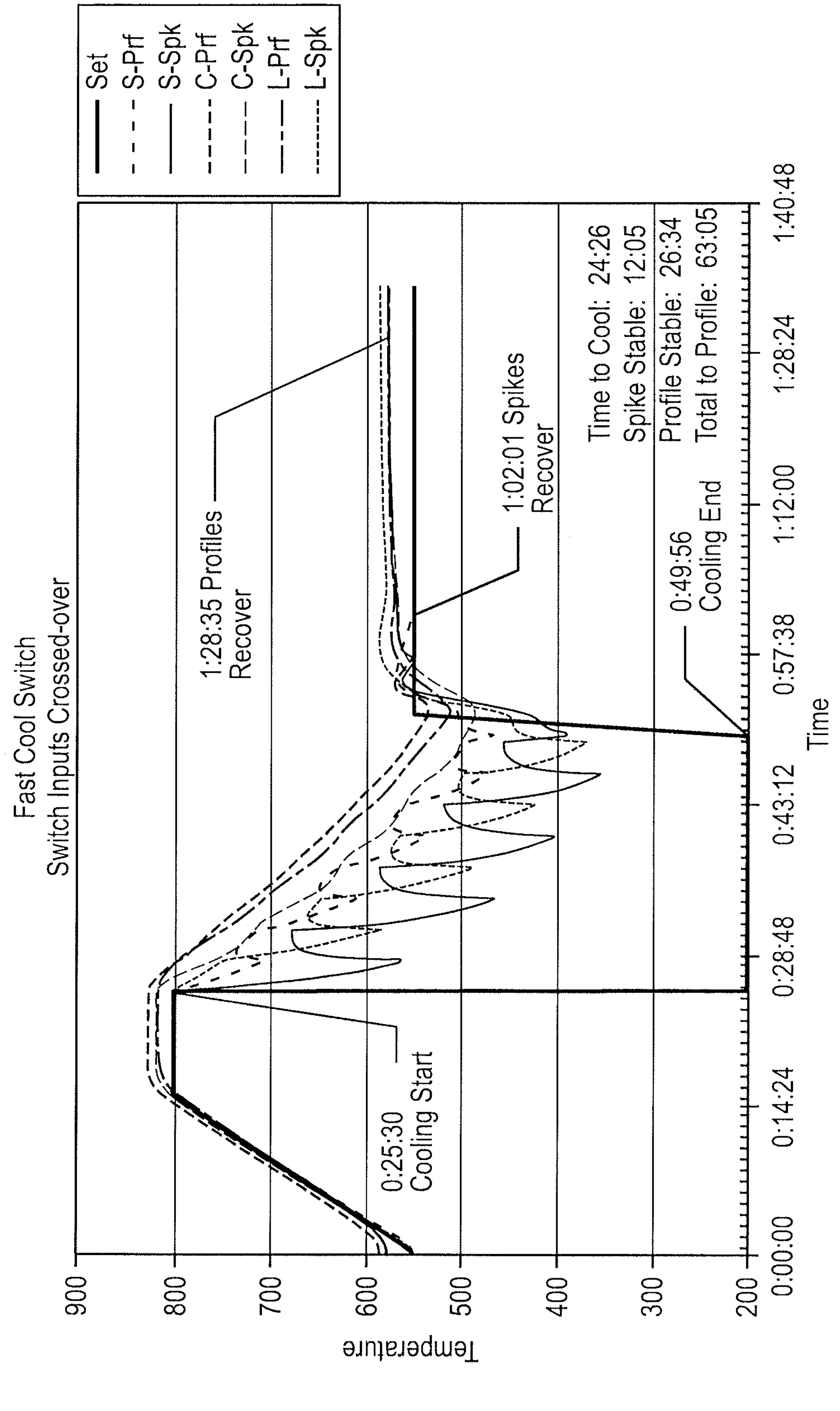
FIG. 8B illustrates an example of bi-directional cooling.

FIG. 8A illustrates an example of cooling in one direction. FIG. 8B illustrates an example of bi-directional cooling. FIGS. 8A and 8B illustrate a reduction in stabilization time from 98 minutes to 63 minutes as a result of the bi-directional cooling enabled by embodiments described above.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A forced fluid switch, comprising:

a first plenum in communication with a first port;

a second plenum in communication with a second port;

a third plenum in switched communication with the first plenum and the second plenum and in communication with a third port; and a fourth plenum in switched communication with the first plenum and the second plenum and in communication with a fourth port;

a first valve assembly configured to switch between the third plenum in communication with the first plenum and the second plenum, the first valve assembly including a first tubular valve seat connecting the first plenum with the third plenum and a second tubular valve seat connecting the second plenum with the fourth plenum, and wherein the first valve assembly includes a first spherical stopper configured to be moved between the first tubular valve seat and the second tubular valve seat; and a second valve assembly configured to switch between the fourth plenum in communication with the first plenum and the second plenum, the first valve assembly including a third tubular valve seat connecting the second plenum with the third plenum and a fourth tubular valve seat connecting the second plenum with the fourth plenum, and wherein the second valve assembly includes a second spherical stopper configured to be moved between the third tubular valve seat and the fourth tubular valve seat, wherein the first, second, third and fourth plenums and the first and second valve assemblies are enclosed within a case forming the forced fluid switch, the enclosing case divided by a first separator dividing the forced fluid switch into a first part and a second part, and wherein a second divider is configured to divide the first part into the first plenum and the second plenum and a third divider is configured to divide the second part into the third plenum and the fourth plenum, wherein the four ports penetrate through exterior walls of the case, wherein the two valve assemblies of the forced fluid switch connect their respective plenums internally to the exterior walls of the case with a first forced fluid path internal to the case and a second forced fluid path internal to the case, wherein in the first forced fluid path, the third plenum is in communication with the first plenum through the first valve assembly and the fourth plenum is in communication with the second plenum through the second valve assembly, and in the second forced fluid path, the third plenum is in communication with the second plenum through the first valve assembly and the fourth plenum is in communication with the first plenum through the second valve assembly, and wherein each port provides external fluid communication for its respective plenum, with the first plenum and the second plenum in fluid communication through the first port and the second port external to the forced fluid switch.

2. The forced fluid switch of claim 1, wherein the fluid is a gas.

3. The forced fluid switch of claim 1, wherein the first spherical stopper is switched between the first tubular valve seat and the second tubular valve seat with a first actuator, and the second spherical stopper is switched between the third tubular valve seat and the fourth tubular valve seat with a second actuator.

4. The forced fluid switch of claim 1, wherein the first spherical stopper is switched between the first tubular valve seat and the second tubular valve seat and the second spherical stopper is switched between the third tubular valve seat and the fourth tubular valve seat by a single actuator.

5. The forced fluid switch of claim 3, wherein the first actuator and the second actuator are selected from the group consisting of: a rotary actuator and a linear actuator.

6. The forced fluid switch of claim 1, wherein fluid travels in the first forced fluid path and the second forced fluid path at least at approximately 100 standard cubic feet per minute (SCFM).

7. The forced fluid switch of claim 1, wherein the diameter of each tubular valve seat is at least approximately 50 millimeters (MM).

8. The forced fluid switch of claim 1, wherein the first spherical stopper is rotationally attached to a first connector and the first connector is attached to a first shaft, wherein the first shaft is in communication with a first actuator, and where the second spherical stopper is rotationally attached to a second connector and the second connector is attached to a second shaft, wherein the second shaft is in communication with a second actuator.

9. The forced fluid switch of claim 1, wherein the fourth port is in communication with a blower configured to blow the forced fluid, the third port is in communication with a vacuum configured to suck the forced fluid, the first port and the second port are in communication with a forced-fluid process chamber, and wherein, in the first forced fluid path, the forced fluid travels from the fourth plenum to the second plenum and from the second plenum via the second port through the forced-fluid process chamber to the first plenum via the first port and from the first plenum to the third plenum, and wherein, in the second forced fluid path, the forced fluid travels from the fourth plenum to the first plenum and from the first plenum via the first port through the forced-fluid process chamber to the second plenum via the second port and from the second plenum to the third plenum.

10. The forced fluid switch of claim 9, wherein the blower is not substantially slowed down in switching from the first forced fluid path to the second forced fluid path.

11. The forced fluid switch of claim 9, wherein the vacuum is not substantially reduced in switching from the first forced fluid path to the second forced fluid path.

12. The forced fluid switch of claim 9, wherein the vacuum is created with a venturi device.

13. The forced fluid switch of claim 9, wherein the vacuum is in communication with an exhaust vent.

14. The forced fluid switch of claim 9, wherein the blower is a centrifugal blower.

15. The forced fluid switch of claim 1, wherein the first plenum and the second plenum incorporate a fluid to water heat exchanger to remove heat from the forced fluid.

16. The forced fluid switch of claim 1, wherein the first valve assembly is substantially incorporated in the third plenum and the second valve assembly is substantially incorporated in the fourth plenum.

17. The forced fluid switch of claim 1, wherein the enclosing case is substantially a box shape.

18. The forced fluid switch of claim 1, wherein the forced fluid switch is sealed except for the first port, the second port, the third port, and the fourth port.

19. The forced fluid switch of claim 1, wherein the first plenum and the second plenum are substantially parallel to each other and the third plenum and the fourth plenum are substantially parallel to each other and wherein the first plenum and the second plenum and the third plenum and the fourth plenum are stacked together such that the orientation of the first plenum and the second plenum is substantially perpendicular to the orientation of the third plenum and the fourth plenum.

* * * * *